(12) United States Patent
Siewert (10) Patent No.: US 9,212,502 B1
(45) Date of Patent: Dec. 15, 2015

(54) BOAT TRAILER CANOPY (71) Applicant: Clyde M. Siewert, Charlotte, MI (US)

(72) Inventor: Clyde M. Siewert, Charlotte, MI (US)

(*) Notice: Subject to any disclaimer, the term of this patent is extended or adjusted under 35 U.S.C. 154(b) by 0 days.

(21) Appl. No.: 14/078,664

(22) Filed: Nov. 13, 2013

(51) Int. Cl.
    *E04H 15/06* (2006.01)
    *B60P 3/10* (2006.01)
    *B60J 7/10* (2006.01)

(52) U.S. Cl.
    CPC .............. *E04H 15/06* (2013.01); *B60J 7/102* (2013.01); *B60P 3/1041* (2013.01)

(58) Field of Classification Search
    CPC .......... B60J 7/102; B60J 7/065; B60P 3/1041
    USPC ............ 135/88.1, 88.13; 296/100.01, 100.02, 296/100.17, 100.18, 136.1, 136.11, 136.12, 296/136.13; 114/361
    See application file for complete search history.

(56) References Cited

U.S. PATENT DOCUMENTS

| 510,330 | A | * | 12/1893 | Davis | 296/104 |
|---|---|---|---|---|---|
| 2,772,912 | A | * | 12/1956 | Neff | 296/171 |
| 2,881,023 | A | * | 4/1959 | Gile et al. | 296/157 |
| 2,927,816 | A | * | 3/1960 | Skuldt | B60P 3/34 296/173 |
| 2,974,999 | A | * | 3/1961 | Stuart | 410/28.1 |
| 3,326,597 | A | * | 6/1967 | Barker | 296/100.15 |
| 4,402,544 | A | * | 9/1983 | Artim et al. | 296/110 |
| 5,538,313 | A | * | 7/1996 | Henning | 296/100.12 |
| 5,641,192 | A | * | 6/1997 | Smith et al. | 296/100.06 |
| 5,769,105 | A | | 6/1998 | Margol et al. | |
| 5,944,039 | A | * | 8/1999 | Bergeron | 135/119 |
| 6,092,856 | A | * | 7/2000 | Ladensack | 296/100.11 |
| 6,447,038 | B1 | | 9/2002 | Davis et al. | |
| 6,488,329 | B1 | * | 12/2002 | Smith | 296/100.07 |
| 6,976,433 | B1 | * | 12/2005 | Neumann | 105/377.03 |
| 7,051,669 | B2 | | 5/2006 | Warfel et al. | |
| 7,325,855 | B2 | * | 2/2008 | Henning et al. | 296/100.11 |
| 7,353,769 | B2 | | 4/2008 | Unrast et al. | |
| 7,520,240 | B2 | | 4/2009 | Tufte | |
| 7,828,316 | B1 | | 11/2010 | Joseph | |
| 7,931,326 | B2 | * | 4/2011 | Beshiri | 296/100.18 |
| 8,123,274 | B1 | * | 2/2012 | Edwards et al. | 296/100.11 |
| 8,286,651 | B1 | | 10/2012 | Maffett | |
| 2009/0038528 | A1 | | 2/2009 | Van Berkel | |
| 2011/0101728 | A1 | * | 5/2011 | Bourcier et al. | 296/100.18 |

* cited by examiner

*Primary Examiner* — Noah Chandler Hawk
(74) *Attorney, Agent, or Firm* — Montgomery Patent & Design; Robert C. Montgomery (57) ABSTRACT

A boat trailer canopy can include a frame configured to be connected to a boat trailer, the frame including a plurality of spaced apart ribs extending along a longitudinal axis of the boat trailer, each rib of the plurality of ribs substantially arching the boat trailer, and a cover extending over frame.

12 Claims, 6 Drawing Sheets

BOAT TRAILER CANOPY

RELATED APPLICATIONS

Not applicable.

FIELD OF THE INVENTION

The present invention relates generally to boat trailers, and more particularly, to a canopy for a boat trailer.

BACKGROUND OF THE INVENTION

Boating remains one of the favorite pastimes and hobbies for many people. However, as anyone who has ever owned or maintained a boat can attest they take a great deal of time and money. Perhaps nowhere is this more evident that during the preparation of the boat for off-season storage.

First of all, seating surfaces such as benches and chairs must be removed, so that the conventional cover will lay flat. Secondly, the user must then find storage locations for these seating surfaces as well as other boating accessories such as fishing rods, life jackets, water skis, and the like. Finally, the boat cover must then be installed with the hopes that it does not become loose during the winter months which would allow the elements access to the inside of the boat causing damage. Even if the cover should remain intact, water and snow is prone to pooling on top the cover which makes removal difficult in the spring.

Accordingly, there is a need for a means by which boats and boating accessories can be easily and securely covered for wintertime storage, without the disadvantages as described above.

SUMMARY OF THE INVENTION

The inventor has recognized the aforementioned inherent problems and lack in the art and observed that there remains a need for an apparatus that provides a means covering a boat supported by a boat trailer. The development of the present invention, which will be described in greater detail herein, substantially departs from conventional solutions to provide a boat trailer canopy and in doing so fulfills this need.

In one (1) embodiment, the disclosed boat trailer canopy can include a frame configured to be connected to a boat trailer, the frame including a plurality of spaced apart ribs extending along a longitudinal axis of the boat trailer, each rib of the plurality of ribs substantially arching the boat trailer, and a cover extending over frame.

In another embodiment, the disclosed boat trailer canopy can include a boat trailer including a trailer frame, the trailer frame including a front end and a rear end, a frame connected to the trailer frame, the frame including a plurality of spaced apart ribs extending along a longitudinal axis of the boat trailer, each rib of the plurality of ribs substantially arching the trailer frame, and a cover extending over the frame.

In yet another embodiment, the disclosed boat trailer canopy can include a nose piece, a plurality of interconnected fixed ribs, a frontmost fixed rib of the plurality of fixed ribs being connected to the nose piece, a floating rib connected to a rear most fixed rib of the plurality of fixed ribs, a cover connected to the nose piece, the plurality of fixed ribs, and the floating rib, wherein the nose piece, the plurality of fixed ribs, and the floating rib form a frame, the frame being configured to be connected to a boat trailer.

Furthermore, the described features and advantages of the disclosed boat trailer canopy can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4b is an enlarged perspective view of the second bracket of FIG. 4a; and,

DESCRIPTIVE KEY 10 boat trailer canopy
20 frame
21 nose piece
22 lead post
23 lead post aperture
24 first tube
25 second tube
26 nose plate
27 fastener
28 nut
29 nose plate aperture
31 fixed rib
32 floating rib
34 vertical section
36 arch
38 rib aperture
40 spine
42 spine tube
44 spine plate
48 spine plate aperture
50 first bracket
52 arm
54 post
58 post aperture
60 second bracket
62 bracket tube
64 bracket plate
66 bracket plate aperture
70 cover
72 cover tie 100 boat trailer
102 trailer frame
110 boat

DETAILED DESCRIPTION OF THE PREFERRED EMBODIMENT

In accordance with the invention, the best mode is presented in terms of the described embodiments, herein depicted within FIGS. 1 through 5. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring to FIGS. 1-5, disclosing a boat trailer canopy (herein referred to as the "apparatus") 10, where like reference numerals represent similar or like parts. The apparatus 10 can be configured to be fitted and connected to a boat trailer 100 and provide cover and protection from the elements for a boat 110 supported by the boat trailer 100.

Figure 1:
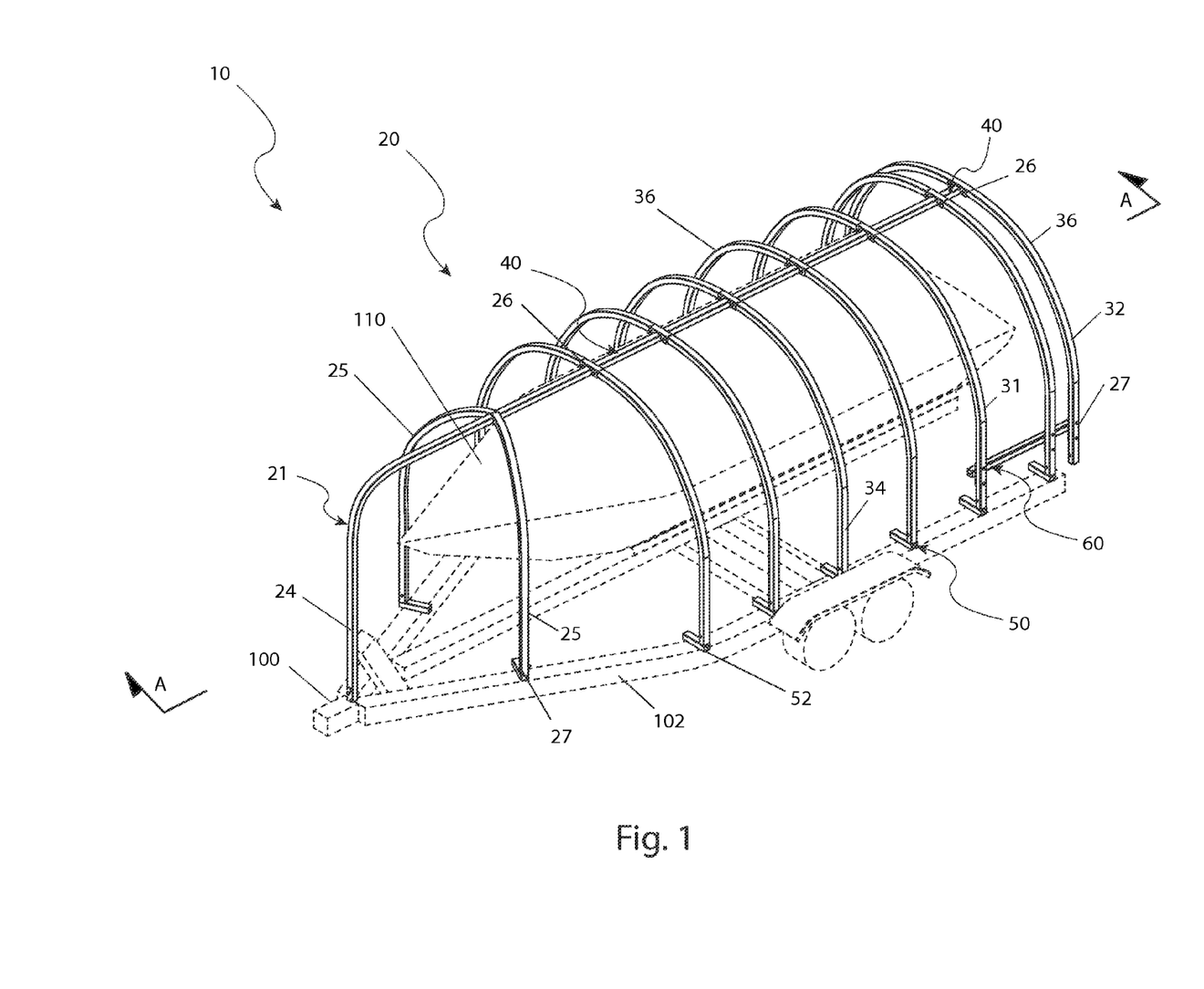
FIG. 1 is a front and side perspective view of one embodiment of the disclosed boat trailer canopy depicted mounted to a boat trailer in accordance with the present invention.
Figures 2A, 2B:
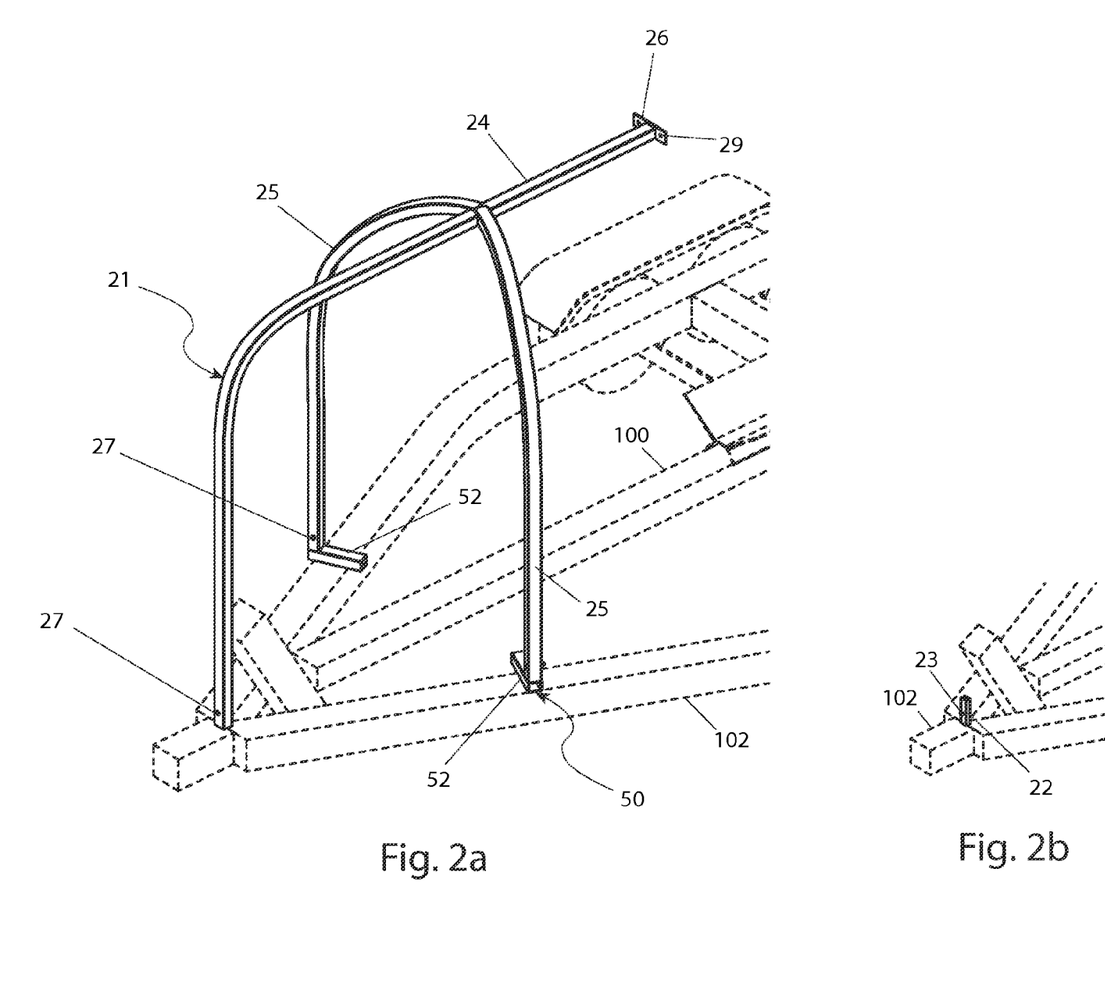
FIG. 2a is a front and side perspective view of the nose piece of the disclosed boat trailer canopy.
FIG. 2b is a front and side perspective view of the lead post of the disclosed boat trailer canopy depicted attached to the boat trailer frame.

Referring now to FIG. 1, the frame 20 can be made from any suitably durable and rigid material, such as, but not limited to, steel tubing, bar, and plate although other materials may be substituted. A lead post 22 (FIG. 2) can be rigidly connected (e.g., affixed) to a front portion of the trailer frame 102. For example, the lead post 22 can be welded to a metal surface of the trailer frame 102. A leading edge of the frame 20 can be defined by a nose piece 21. The nose piece 21 can include a single, centrally-located first tube 24, rising substantially vertically from the lead post 22 and arching rearwardly along a longitudinal axis A of the boat trailer 100, and a pair of second tubes 25, rising substantially vertically from a pair of first brackets 50 attached to the trailer frame 102 and arching in a direction generally perpendicularly to the portion of the trailer frame 102 to which the first brackets 50 are attached. The pair of second tubes 25 can intersect with and can be attached to the first tube 24.

Figure 3A:
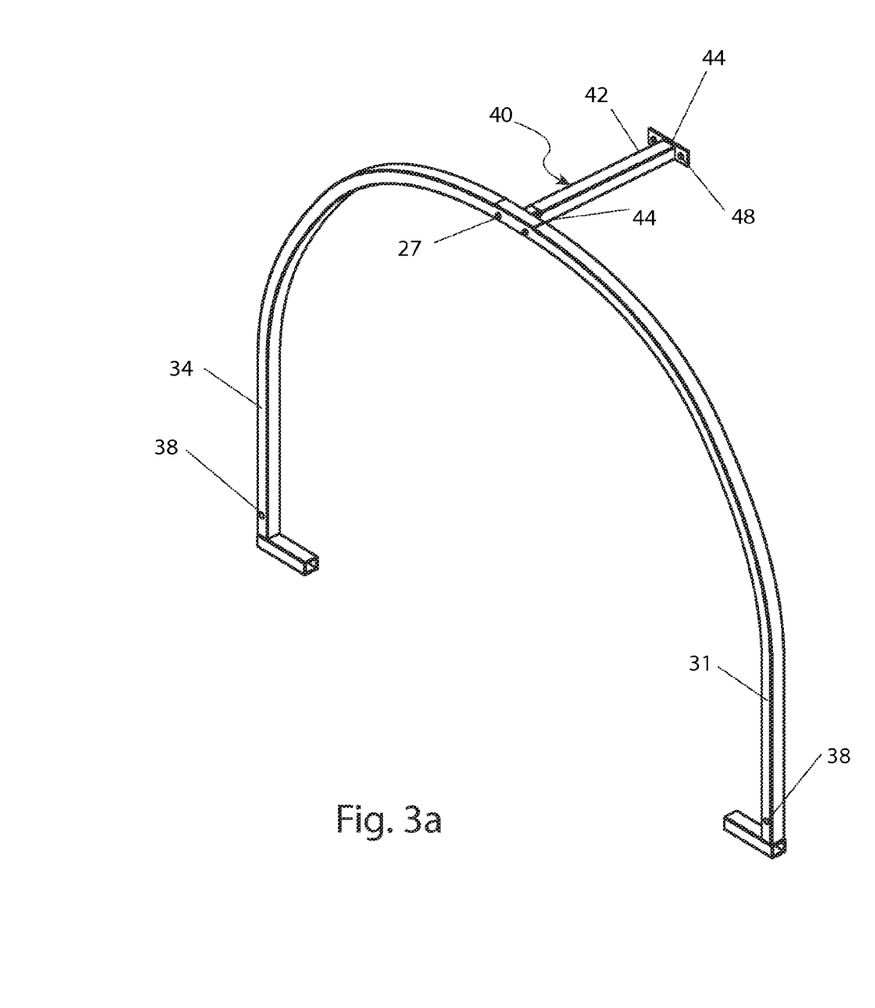
FIG. 3a is a front and side perspective view of the spine and the fixed rib of the disclosed boat trailer canopy.
Figure 3B:
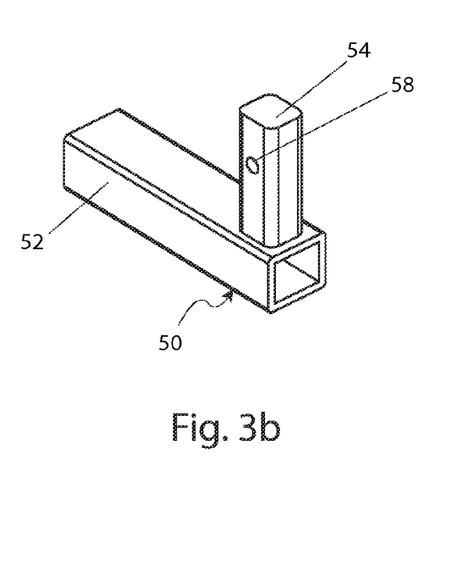
FIG. 3b is a front and side perspective view of the first bracket of the disclosed boat trailer canopy.

The first brackets 50 can include a tubular steel arm 52 and a post 54 connected to the trailer frame 102. For example, the first bracket 50 can be welded to the trailer frame 102 or can be attached by any other suitable method (e.g., a bracket configured to be used with the second tube 25). A tube aperture (not shown) disposed in the first tube 24 at or near a lower end can be aligned with a lead post aperture 23 disposed in the lead post 22. A fastener 27 can be inserted and secured (e.g., with a nut 28) to connect the first tube 24 to the lead post 22. A nose plate 26, for example made of a steel plate, can be connected (e.g., welded) to the upper end of the first tube 24.

A plurality of fixed ribs 31 can be evenly spaced along the parallel side members of the trailer frame 102. The fixed ribs 31 and the floating rib 32 can be oriented generally perpendicularly to the longitudinal axis A of the boat trailer 100 and can be formed from tubular steel members having a vertical section 34 on each side connected by an arch 36 (FIG. 3a). Disposed near a lower end of each vertical section 34 of the fixed rib 31 is at least one rib aperture 38.

The fixed ribs 31 can be generally symmetrical about a longitudinal axis and the transverse axes and therefore, may not be sensitive to specific spatial orientations. The fixed ribs 31 can be connected to the first brackets 50, which are connected to the trailer frame 102. The vertical sections 34 of the fixed ribs 31 can be fit over a corresponding post 54 of each first bracket 50.

The rib apertures 38 can be aligned with corresponding post apertures 58, whereupon fasteners 27 can be inserted therein and retained with nuts 28 to attach each side of the fixed rib 31 to the pair of first brackets 50.

Figure 4A:
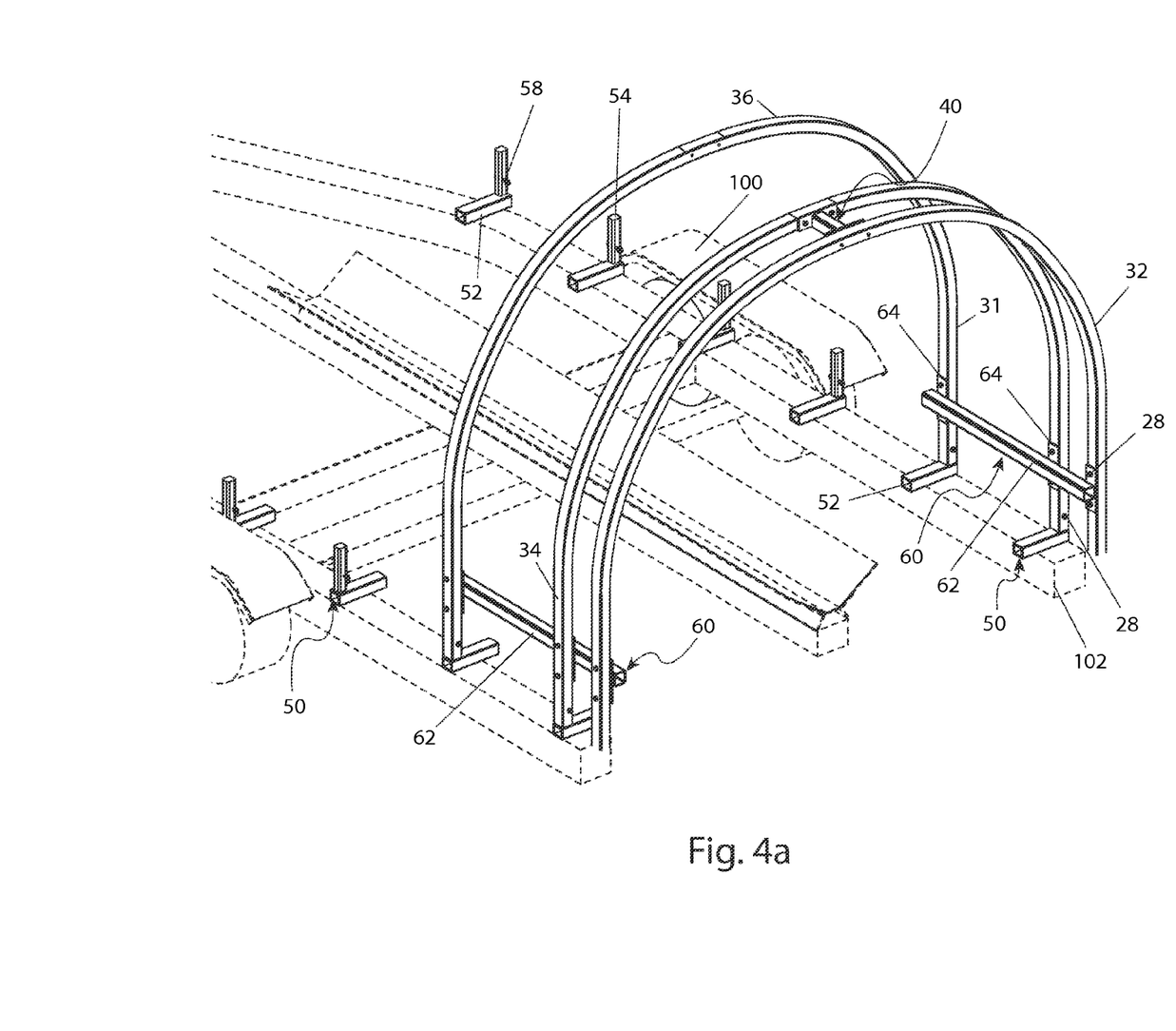
FIG. 4a is a side and rear perspective view of the floating rib and the second brackets of the disclosed boat trailer canopy.

A floating rib 32, positioned beyond the rear of the trailer frame 102, can be connected to a pair of second brackets 60, which can be attached to the two (2) rearmost fixed ribs 31 (FIG. 4a). The floating rib 32 can be formed from a tubular steel member with two (2) vertical sections 34 connected by an arch 36 and having two (2) apertures disposed in the center of the arch 36 (e.g., similar to the fixed ribs 31). However, the two (2) apertures of the floating rib 32 can be disposed slightly higher on the vertical sections 34 for attachment to bracket plates 64 of the second bracket 60.

Each spine 40 (FIGS. 1 and 3a) can include a length of square, steel spine tube 42 with a spine plate 44 connected (e.g., welded) to each end. Disposed in each spine plate 44 can be a pair of plate apertures 48. As the first fixed rib 31 is attached to the trailer frame 102, the nose plate apertures 29 can be aligned with the apertures in the middle of the fixed rib 31 and a set of plate apertures 48; then the nose plate 26, the fixed rib 31, and the spine plate 44 can be connected (e.g., by a pair of fasteners 27 inserted through the nose plate apertures 29, the apertures in the middle of the fixed rib 31, and a set of plate apertures 48 and secured with a nut 28).

The remaining fixed ribs 31 can be attached in a similar manner to the first fixed rib 31 with the vertical sections 34 being connected to additional first brackets 50 and the arch 36 being sandwiched between the spine plate 44 of a preceding adjacent spine 40 and the spine plate 44 of a successive adjacent spine 40.

Optionally, additional backing washers and/or lock washers may be incorporated in the bolted connections according to any embodiment without limiting the scope of the apparatus 10.

Figure 4B:
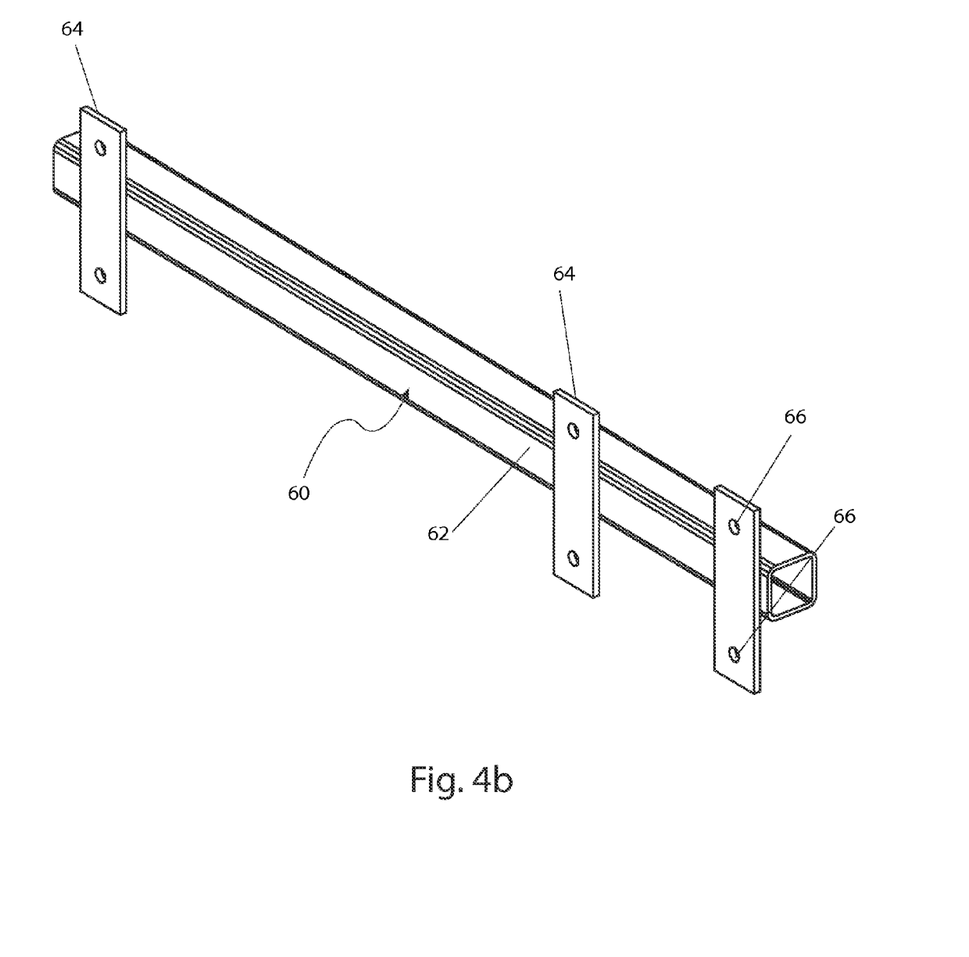

The second bracket 60 can include a length of square, steel bracket tube 62 to which a plurality of bracket plates 64 are connected (e.g., welded) (FIG. 4b). Disposed in each of the bracket plates 64 is a pair of bracket plate apertures 66. The bracket plate apertures 66 can be aligned with corresponding apertures in the two (2) rearmost fixed ribs 31 and the second brackets 60 can be connected to each vertical section 34 of the fixed ribs 31 (e.g., with fasteners 27 and retained with nuts 28). The floating rib 32 can be connected to the second brackets 60 by aligning the apertures in the vertical sections 34 with the apertures in the rearmost bracket plates 64 (e.g., inserting fasteners 27 retained by nuts 28). The floating rib 32 can be connected to the spine plate 44 at the rear of the rearmost spine 40.

Figure 5:
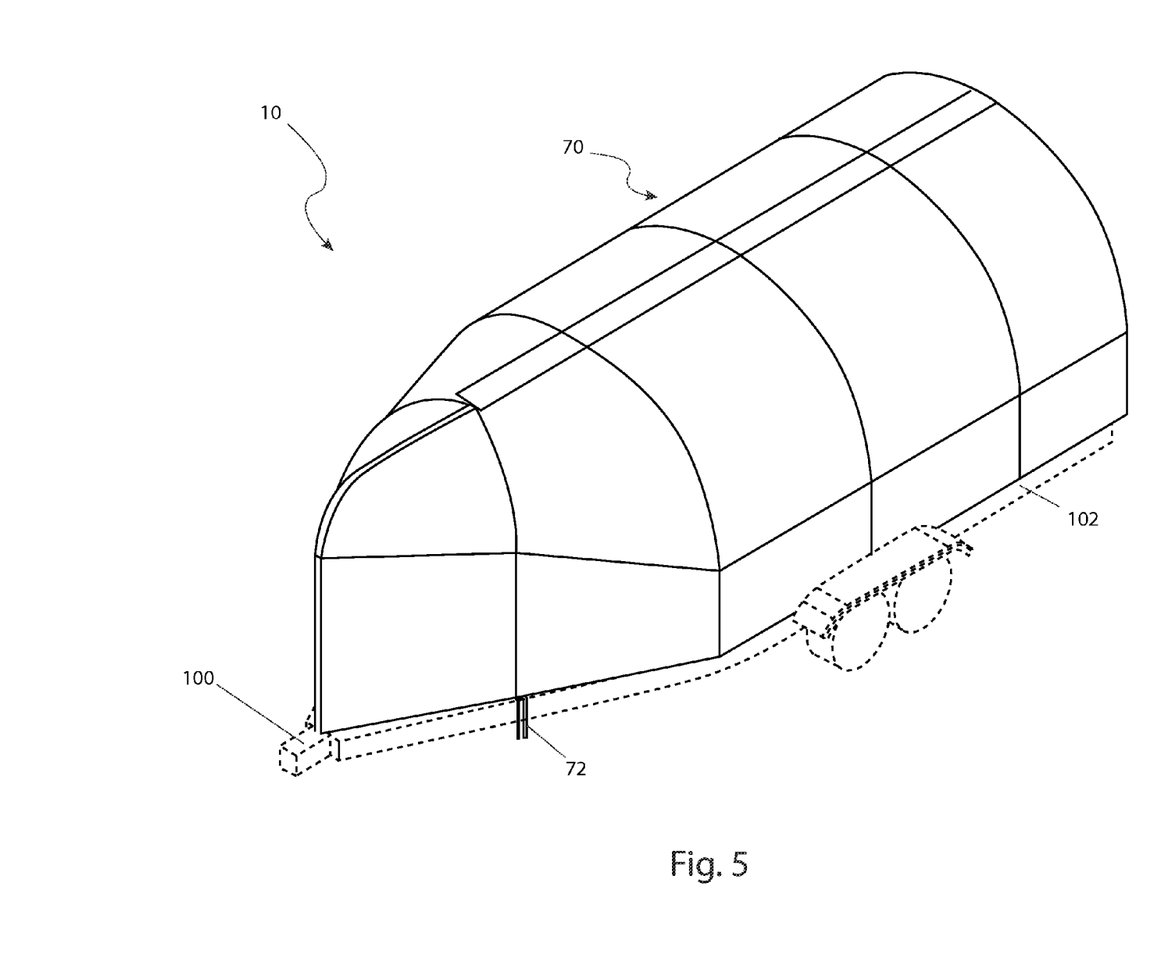
FIG. 5 is a front and side perspective view of the disclosed boat trailer canopy depicted with the attached cover.

Referring now to FIG. 5, a cover 70 can be made from a canvas material or other suitable materials, such as reinforced polyethylene. The arch 36 of the fixed ribs 31 and the floating rib 32 can minimize any flat spots in the cover 70 so that snow and/or rain will more easily run off so as not to pool on the cover 70. The cover 70 can include a single panel or of a plurality of panels bonded together (e.g., sewn or adhered) to form an exterior covering for the frame 20.

The cover 70 can include any number of overlapping openings at any point along the frame 20, such as at the front or the rear, for ease of installation or for access to the interior of the frame 20 for any reason. The cover 70 can be equipped with translucent panels of any of a variety of materials to permit light to enter the frame 20. The cover 70 can be equipped with a plurality of cover ties 72 located at strategic points about the perimeter and at any openings to permit securing the cover 70 to any part of itself, or to the frame 20, or to the trailer frame 102.

The cover ties 72 can include a single length, or a pair of lengths of canvas material, or rope, or other suitable material, sewn, or otherwise bonded to the cover 70. The cover ties 72 can incorporate the use of buckles, loops, hooks, or binders to achieve the purpose of securely attaching the cover 70 to the frame 20.

It is envisioned that other styles and configurations of the disclosed apparatus 10 can be easily incorporated into the teachings of the present disclosure, and only certain particular embodiments have been shown and described for purposes of clarity and disclosure and not by way of limitation of scope.

In an example implementation, the user can install and utilize the example embodiments of the apparatus 10 in a simple and straightforward manner with little or no training. After initial purchase or acquisition of the apparatus 10, it can be installed and utilized as indicated in FIGS. 1 and 5.

An example method for installing and utilizing the apparatus 10 may be achieved by performing the following steps: acquiring a model of the apparatus 10; installing the nose piece 21 of the frame 20 onto the boat trailer 100 by aligning the first tube 24 with the attached lead post 22 and the second tubes 25 with corresponding first brackets 50 located on the trailer frame 102; installing the appropriate fasteners 27 into the provided apertures 23, 58 and securing the fasteners 27 with nuts 28; installing the first fixed rib 31 onto the posts 54 of the appropriate first brackets 50 welded to the trailer frame 102; aligning the rib apertures 38 with the corresponding post apertures 58 and inserting the appropriate fasteners 27 and securing the fasteners 27 with nuts 28; aligning the nose plate apertures 29 with the apertures in the middle of the fixed rib 31 and a set of plate apertures 48 and inserting a pair of fasteners 27 through the nose plate 26, the fixed rib 31, and the spine plate 44 to attach all of the pieces together securing the connection with a nut 28; installing each successive fixed rib 31 in a similar manner until all of the fixed ribs 31 and all of the spines 40 have been installed and properly bolted into place; attaching the second brackets 60 to the two (2) rearmost fixed ribs 31 by aligning the bracket plate apertures 66 with corresponding apertures in the fixed ribs 31 and inserting the appropriate fasteners 27 and securing the fasteners 27 with nuts 28; attaching the floating rib 32 to the rearmost bracket plates 64 and the rearmost spine 40 with the appropriate fasteners 27 and nuts 28; loading the boat 110 onto the boat trailer 100; installing the cover 70 over the frame 20 and securing the cover 70 to the frame 20 and to the trailer frame 102 using the cover ties 72 as necessary.

The foregoing embodiments of the disclosed boat trailer canopy have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:
1. A boat trailer canopy comprising:
a frame configured to be rigidly connected to a boat trailer, said frame comprising:
   a front end and a rear end longitudinally opposed to said front end;
   a plurality of spaced apart fixed ribs extending along a longitudinal axis of said boat trailer, wherein each fixed rib of said plurality of fixed ribs is rigidly connected to said boat trailer in a parallel orientation to each other and in a perpendicular orientation to said boat trailer and substantially arches over said boat trailer;
   a nose piece rigidly connected to a front most fixed rib of said plurality of fixed ribs and configured to be rigidly connected to said boat trailer;
   at least one floating rib rigidly connected only to a rear most fixed rib of said plurality of fixed ribs in a parallel orientation to said rear most fixed rib; and,
   a spine extending centrally from said front end to said rear end and rigidly interconnected center portions of said nose piece to said front most fixed rib of said plurality of fixed ribs, said each fixed rib to an adjacent fixed rib of said plurality of fixed ribs, and said floating rib to a rear most fixed rib of said plurality of fixed ribs; and,
a cover extending over said frame.

2. The boat trailer canopy of claim 1, wherein said frame comprises a lead post, said lead post configured to be rigidly connected to a front end of said boat trailer; and wherein said nose piece is rigidly connected to said lead post.

3. The boat trailer canopy of claim 1, wherein said frame comprises a plurality of first brackets, each first bracket of said plurality of first brackets configured to be rigidly connected to said boat trailer; and wherein each fixed rib of said plurality of fixed ribs is rigidly connected to laterally opposed pairs of first brackets.

4. The boat trailer canopy of claim 1, further comprising a pair of second brackets, each second bracket of said pair of second brackets rigidly connected between said floating rib and said rear most fixed rib.

5. The boat trailer canopy of claim 1, wherein said canopy is connected to said frame.

6. The boat trailer canopy of claim 5, wherein said canopy comprises a plurality of cover ties, each cover tie of said plurality of cover ties being configured to be connected to said boat trailer.

7. A boat trailer canopy comprising:
- a boat trailer comprising a trailer frame, said trailer frame comprising a trailer front end and a trailer rear end;
- a frame rigidly connected to said trailer frame, said frame comprising
  - a frame front end and a frame rear end longitudinally opposed to said frame front end;
  - a plurality of spaced apart fixed ribs extending along a longitudinal axis of said trailer frame, wherein each fixed rib of said plurality of fixed ribs is rigidly connected to said boat trailer in a parallel orientation to each other and in a perpendicular orientation to said boat trailer and substantially arches over said trailer frame;
  - a nose piece rigidly connected to a front most fixed rib of said plurality of fixed ribs and rigidly connected to said trailer frame at said trainer front end;
  - at least one floating rib rigidly connected only to a rear most fixed rib of said plurality of fixed ribs in a parallel orientation to said rear most fixed rib; and,
  - a spine extending centrally from said frame front end to said frame rear end and rigidly interconnected center portions of said nose piece to said front most fixed rib of said plurality of fixed ribs, said each fixed rib to an adjacent fixed rib of said plurality of fixed ribs, and said floating rib to a rear most fixed rib of said plurality of fixed ribs; and,
- a cover extending over said frame.

8. The boat trailer canopy of claim 7, wherein said front most fixed rib is connected to said trailer frame near said trailer front end; and wherein said rear most fixed rib is connected to said trailer frame at said trailer rear end.

9. The boat trailer canopy of claim 7, wherein said frame comprises a lead post, said lead post rigidly connected said trailer frame at said trailer front end; and wherein said nose piece is rigidly connected to said lead post.

10. The boat trailer canopy of claim 7, wherein said frame comprises a plurality of first brackets, each first bracket of said plurality of first brackets rigidly connected to said trailer frame; and wherein each fixed rib of said plurality of fixed ribs is rigidly connected to laterally opposed pairs of first brackets.

11. The boat trailer canopy of claim 7, wherein said frame comprises a pair of second brackets, each second bracket of said pair of second brackets rigidly connected between said floating rib and said rear most fixed rib.

12. The boat trailer canopy of claim 7, wherein said canopy comprises a plurality of cover ties, each cover tie of said plurality of cover ties connected to at least one of said frame and said trailer frame.

* * * * *